(12) United States Patent
Arrigoni et al.

(10) Patent No.: US 9,029,464 B2
(45) Date of Patent: May 12, 2015

(54) PERFLUOROELASTOMER GELS

(71) Applicant: Solvay S.A., Brussels (BE)

(72) Inventors: Stefano Arrigoni, Novara (IT); Marco Apostolo, Novara (IT); Margherita Albano, Milan (IT)

(73) Assignee: Solvay Solexis S.p.A., Bollate (IT)

( * ) Notice: Subject to any disclaimer, the term of this patent is extended or adjusted under 35 U.S.C. 154(b) by 0 days.

(21) Appl. No.: 13/921,929

(22) Filed: Jun. 19, 2013

(65) Prior Publication Data

US 2013/0317162 A1    Nov. 28, 2013

Related U.S. Application Data

(62) Division of application No. 11/153,919, filed on Jun. 16, 2005, now abandoned.

(30) Foreign Application Priority Data

Jun. 22, 2004  (IT) .............................. MI2004A1251

(51) Int. Cl.
| | | |
|---|---|---|
| *C08L 27/18* | (2006.01) | |
| *C08F 16/24* | (2006.01) | |
| *C08F 6/22* | (2006.01) | |
| *C08L 27/12* | (2006.01) | |

(52) U.S. Cl.
CPC . *C08L 27/18* (2013.01); *C08F 6/22* (2013.01); *C08L 27/12* (2013.01); *C08L 2205/02* (2013.01)

(58) Field of Classification Search
CPC ......... C08L 27/18; C08L 27/12; C08L 27/16; C08F 214/262; C08F 14/26; C08F 214/26; C08F 14/18; C08F 114/26; C08F 2/22; C08F 214/28; C08F 216/1408; C08F 214/22; C08F 6/14; C08F 6/00; C08F 297/04
USPC ........ 524/544, 545; 525/326.2, 199; 526/247, 526/249, 250, 253, 255
See application file for complete search history.

(56) References Cited

U.S. PATENT DOCUMENTS

| | | | |
|---|---|---|---|
| 6,013,712 A | 1/2000 | Chittofrati et al. | |
| 8,030,412 B2 | 10/2011 | Suzuki et al. | |
| 2002/0193525 A1* | 12/2002 | Apostolo et al. ............... 525/199 |
| 2003/0153674 A1 | 8/2003 | Visca et al. | |
| 2003/0162022 A1* | 8/2003 | Jing et al. .................... 428/411.1 |
| 2003/0187144 A1 | 10/2003 | Staccione et al. | |
| 2004/0092653 A1 | 5/2004 | Ruberti et al. | |
| 2004/0220361 A1 | 11/2004 | Fukuda et al. | |
| 2005/0282954 A1 | 12/2005 | Arrigoni et al. | |
| 2005/0282955 A1 | 12/2005 | Apostolo et al. | |
| 2010/0330349 A1 | 12/2010 | Ewald et al. | |

FOREIGN PATENT DOCUMENTS

| | | |
|---|---|---|
| EP | 1 609 806 A1 | 12/2005 |
| EP | 1 609 806 B1 | 12/2005 |
| EP | 1 626 068 A1 | 2/2006 |
| EP | 1 626 068 B1 | 2/2006 |
| JP | 2006009011 A | 1/2006 |
| JP | 2006009012 A | 1/2006 |
| KR | 20060048443 A | 5/2006 |
| KR | 20060048462 A | 5/2006 |
| WO | WO 2010/092021 A1 | 8/2010 |
| WO | WO 2010/092022 A1 | 8/2010 |
| WO | WO 2012/168351 A1 | 12/2012 |

OTHER PUBLICATIONS

E. M. Hendriks et al., Coagulation Equation with Gelation, Journal of Statistical Physics, 1983, vol. 31, No. 3.
I. L. Knunyants et al., Institute of Heteroorganic Compounds; Academy of Sciences; USSR Translated from Izvestiya Akademii Nauk SSSR, Ser. Khim, No. Feb. 2, 1964, pp. 358-361.
Van Dongen et al., "On the Occurence of Gelation Transition in Smoluchowski's Coagulation Equation", Journal of Statistical Physics, 1986, vol. 44, No. 5/6.
website:http://en.wikipedia.org./wiki/Vinyl_polymer, Jan. 14, 2008.
website:http://sciencelinks.jp/j-east/article/200707/000020070705A0448623.php, Dec. 4, 2009.

* cited by examiner

*Primary Examiner* — James J Seidleck
*Assistant Examiner* — S. Camilla Pourbohloul
(74) *Attorney, Agent, or Firm* — Arent Fox

(57) ABSTRACT

Perfluoroelastomeric gel having the following properties:
  appearance: transparent gelatinous solid;
  water content between 10% and 90% by weight;
  density between 1.1 and 2.1 g/cm$^3$;
said gel satisfies the following test: dried in a stove at 90° C. until a constant weight gives curable perfluoroelastomers.

33 Claims, No Drawings

PERFLUOROELASTOMER GELS

CROSS-REFERENCE TO RELATED APPLICATION

This is a Divisional Application, which claims the benefit of pending U.S. patent application Ser. No. 11,153,919, filed June. 16, 2005, which claims the benefit of priority from the prior Italian Patent Application No. MI2004 A 001251, filed Jun. 22, 2004, the entire contents of which are incorporated herein by reference.

The present invention relates to perfluoroelastomeric compositions having an improved thermal resistance, improved sealing properties, improved mechanical properties.

The cured perfluoroelastomers of the present invention are used in the preparation of manufactured articles as O-ring, gaskets, shaft seals, fuel hoses, etc., showing the combination of the above improved properties.

It is known that fluoroelastomers are used for their high properties of chemical resistance, thermal resistance, good sealing properties and low permeability. The market request is to have available perfluoroelastomers having improved above properties. See for example EP 1,031,607, EP 1,031,606, U.S. Pat. No. 5,585,449, U.S. Pat. No. 5,948,868, U.S. Pat. No. 5,902,857.

Generally in the prior art perfluoroelastomers are used up to temperatures of 230° C. If an improvement of thermal resistance is desired, it is necessary to use particular curing systems. See U.S. Pat. No. 5,902,857 and U.S. Pat. No. 5,948,868 wherein the crosslinking agent is a bis-olefin, which allows to obtain manufactured articles usable up to temperatures of the order of 300° C. Generally it is also known that by increasing the use temperature, for example from 275° C. to 300° C., the sealing and thermal resistance properties notably worsen.

The need was felt to have available cured perfluoroelastomers having an improved thermal resistance, improved sealing properties, improved mechanical properties.

As a matter of fact perfluoroelastomers are required, which, cured with conventional crosslinking agents, for example triallylisocyanurate can be mentioned, show an improved combination of the above properties, in particular an use temperature higher than those obtained by using this crosslinking agnt according to the prior art. For example by using triallylisocyanurate, the perfluoroelastomers on the market are usable at most up to 230° C. Perfluoroelastomers cured with triallylisocyanurate having a higher thermal rating are desired by users.

Perfluoroelastomers are likewise required, which, cured with bis-olefins, show an improved combination of the above properties, in particular an use temperature higher than those obtained by using said crosslinking agents according to the prior art. For example by using bis-olefins, the perfluoroelastomers on the market are usable at most up to 300° C. See for example U.S. Pat. No. 5,948,868 and U.S. Pat. No. 5,902,857. Perfluoroelastomers cured with bis-olefins having a higher thermal rating are desired by users.

The Applicant has found a solution to the above technical problem and to obtain perfluoroelastomers having the combination of the above improved properties.

An object of the present invention are perfluoroelastomeric gels having the following properties:
appearance: transparent gelatinous solid;
water content between 10% and 90% by weight;
density between 1.1 and 2.1 g/cm$^3$;
the gel satisfying the following test: the gel subjected to drying in a stove at 90° C. up to a constant weight gives a curable perfluoroelastomer.

From said curable perfluoroelastomers, cured perfluoroelastomers are obtained having an improved thermal resistance, improved sealing properties, improved mechanical properties compared with the perfluoroelastomers obtained according to the prior art, therefore not from perfluoroelastomeric gels.

Said gels are obtainable with the process described hereunder.

The invention perfluoroelastomeric gel contains TFE-based perfluoroelastomers with at least another (per)fluorinated comonomer having at least one unsaturation of ethylene type.

Preferably the comonomer is selected from the following:
$CF_2$=$CFOR_f$ (per)fluoroalkylvinylethers (PAVE), wherein $R_f$ is a $C_1$-$C_6$ (per) fluoroalkyl;
$CF_2$=CFOX (per) fluoro-oxyalkylvinylethers, wherein X is a $C_1$-$C_{12}$ (per) fluorooxyalkyl, containing one or more ether groups;
perfluorodioxoles of formula:

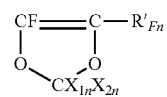

(IA)

wherein $R'_{Fn}$ is equal to $R_{Fn}$ or $OR_{Fn}$ wherein $R_{Fn}$ is a linear or branched perfluoroalkyl radical with 1-5 carbon atoms, preferably $R'_{Fn}$=$OCF_3$; $X_{1n}$ and $X_{2n}$, equal to or different from each other, are F, $CF_3$;
(per)fluorovinylethers (MOVE) of general formula $CFX_{AI}$=$CX_{AI}OCF_2OR_{AI}$ (A-I) wherein $R_{AI}$ is a $C_2$-$C_6$ linear, branched or $C_5$-$C_6$ cyclic perfluoroalkyl group, or a $C_2$-$C_6$ linear, branched perfluorooxyalkyl group containing from one to three oxygen atoms; $R_{AI}$ can optionally contain from 1 to 2 atoms, equal or different, selected from the following: Cl, Br, I; $X_{AI}$=F; the compounds of general formula: $CFX_{AI}$=$CX_{AI}OCF_2OCF_2CF_2Y_{AI}$ (A-II) are preferred, wherein $Y_{AI}$=F, $OCF_3$; $X_{AI}$ as above; in particular (MOVE 1) $CF_2$=$CFOCF_2OCF_2CF_3$ and (MOVE 2) $CF_2$=$CFOCF_2OCF_2OCF_3$;
$C_3$-$C_8$ perfluoroolefins; as, for example, hexafluoropropene;
$C_2$-$C_8$ (per)fluoroolefins containing chlorine and/or bromine and/or iodine atoms;
perfluorovinylethers containing hydrocyanic groups as described in U.S. Pat. No. 4,281,092, U.S. Pat. No. 5,447,993, U.S. Pat. No. 5,789,489.

Preferred monomeric compositions of the perfluoroelastomers of the invention are the following, the sum of the comonomer percentages being 100%:
tetrafluoroethylene (TFE) 50-85%, perfluoroalkyl-vinylether (PAVE) and/or perfluorovinyl-ethers (MOVE) 15-50%.

Particularly preferred specific compositions are the following, the sum of the comonomer percent being 100%:
TFE 50-85%, PAVE 15-50%;
TFE 50-85%, MOVE 1 15-50%;
TFE 50-85%, MOVE 2 15-50%;
TFE 50-85%, PAVE 1-40%, MOVE 1 1-40%;
TFE 50-85%, PAVE 1-40%, MOVE 2 1-40%.

Preferably perfluoroelastomers comprise also monomeric units deriving from a bis-olefin of general formula:

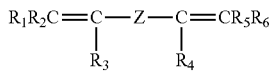  (I)

wherein:

$R_1, R_2, R_3, R_4, R_5, R_6$, equal to or different from each other, are H or $C_1$-$C_5$ alkyls;

Z is a $C_1$-$C_{18}$ linear or branched alkylene or cycloalkylene radical, optionally containing oxygen atoms, preferably at least partially fluorinated, or a (per)fluoropolyoxyalkylene radical, as described in EP 661,304 in the name of the Applicant.

In formula (I), Z is preferably a $C_4$-$C_{12}$, more preferably $C_4$-$C_8$, perfluoroalkylene radical, while $R_1$, $R_2$, $R_3$, $R_4$, $R_5$, $R_6$ are preferably hydrogen;

when Z is a (per)fluoropolyoxyalkylene radical, it can comprise units selected from the following:
—$CF_2CF_2O$—, —$CF_2CF$ ($CF_3$) O—, —$CFX_1O$— wherein $X_1$=F, $CF_3$, —$CF_2CF_2CF_2O$—, —$CF_2CH_2CH_2O$—, —$C_3F_6O$—.

Preferably Z has formula:

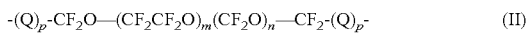  (II)

wherein: Q is a $C_1$-$C_{10}$ alkylene or oxyalkylene radical; p is 0 or 1; m and n are numbers such that the m/n ratio is between 0.2 and 5 and the molecular weight of said (per)-fluoropolyoxyalkylene radical is in the range 500-10,000, preferably 700-2,000.

Preferably Q is selected from:
—$CH_2OCH_2$—; —$CH_2O(CH_2CH_2O)_sCH_2$—, s being=1-3.

The bis-olefins of formula (I) wherein Z is an alkylene or cycloalkylene radical can be prepared according to what described, for example, by I. L. Knunyants et al. in "Izv. Akad. Nauk. SSSR", Ser. Khim., 1964(2), 384-6. The bis-olefins containing (per) fluoropolyoxyalkylene structures are described in U.S. Pat. No. 3,810,874.

The unit amount in the chain deriving from the bis-olefins of formula (I) is generally from 0.01 to 1.0 moles, preferably from 0.03 to 0.5 moles, still more preferably from 0.05 to 0.2 moles per 100 moles of the other above mentioned monomeric units, constituting the basic perfluoroelastomer structure.

Optionally the invention perfluoroelastomeric gel contains a semicrystalline (per)fluoropolymer, in an amount in percent by weight referred to the total dry weight perfluoroelastomer semicrystalline perfluoropolymer, from 0% to 70%, preferably from 0% to 50% by weight, still more preferably from 2% to 30% by weight, on the total of the monomer moles.

With semicrystalline (per)fluoropolymer it is meant a (per)fluoropolymer showing, besides the glass transition temperature Tg, at least a crystalline melting temperature.

The semicrystalline (per)fluoropolymer is constituted of tetrafluoroethylene (TFE) homopolymers, or TFE copolymers with one or more monomers containing at least one unsaturation of ethylene type, in an amount from 0.01% to 10% by moles, preferably from 0.05% to 7% by moles.

Said comonomers having an ethylene unsaturation are of hydrogenated and fluorinated type. Among those hydrogenated, ethylene, propylene, acrylic monomers, for example methyl-methacrylate, (meth)acrylic acid, butylacrylate, hydro-xyethylhexylacrylate, styrene monomers, can be mentioned.

Among fluorinated comonomers it can be mentioned:
$C_3$-$C_8$ perfluoroolefins, as hexafluoropropene (HFP), hexa-fluoroisobutene;
$C_2$-$C_8$ hydrogenated fluoroolefins, as vinyl fluoride (VF), vinylidene fluoride (VDF), trifluoroethylene, $CH_2$=$CH$—$R_f$ perfluoroalkylethylene, wherein $R_f$ is a $C_1$-$C_6$ perfluoroalkyl;
$C_2$-$C_8$ chloro- and/or bromo- and/or iodo-fluoroolefins, as chlorotrifluoroethylene (CTFE);
$CF_2$=$CFOR_f$ (per) fluoroalkylvinylethers (PAVE), wherein $R_f$ is a $C_1$-$C_6$ (per)fluoroalkyl, for example $CF_3$, $C_2F_5$, $C_3F_7$;
$CF_2$=$CFOX$ (per)fluoro-oxyalkylvinylethers, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups;
(per) fluorodioxoles, preferably perfluorodioxoles.

PAVEs, in particular perfluoromethyl-, perfluoroethyl-, perfluoropropylvinylether and (per) fluorodioxoles, preferably perfluorodioxoles, are preferred comonomers.

Optionally the semicrystalline (per)fluoropolymer is coated by a shell of a semicrystalline (per)fluoropolymer containing bromine and/or iodine atoms in the chain deriving from brominated and/or iodinated comonomers, in an amount from 0.1% to 10% by moles referred to the total moles of the basic monomeric units of the semicrystalline (per)fluoropolymer core+shell, the semicrystalline (per)fluoropolymer in the core and in the shell can be of different composition. See EP 1,031,606.

The preparation of a perfluoroelastomers and the semicrystalline (per)fluoropolymers of the present invention is carried out by polymerization of the monomers in aqueous emulsion in the presence of an emulsion, dispersion or microemulsion of perfluoropolyoxyalkylenes, according to U.S. Pat. No. 4,789,717 and U.S. Pat. No. 4,864,006. Preferably the synthesis is carried out in the presence of a perfluoropolyoxyalkylene microemulsion.

According to well known methods of the prior art, radical initiators, for example, alkaline or ammonium persulphates, perphosphates, perborates or percarbonates, optionally in combination with ferrous, cuprous or silver salts, or other easily oxidizable metals, are used. Also surfactants of various type are optionally present in the reaction medium, among which fluorinated surfactants of formula:

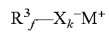

are particularly preferred, wherein $R^3_f$ is a $C_5$-$C_{16}$ (per) fluoroalkyl chain or (per)fluoropolyoxyalkyl chain, $X_k^-$ is —$COO^-$ or —$SO_3^-$, $M^+$ is selected among: $H^+$, $NH_4^+$, or an alkaline metal ion. Among the most commonly used we remember: ammonium perfluoro-octanoate, (per)fluoropolyoxyalkylenes ended with one or more carboxylic groups, etc. See U.S. Pat. No. 4,990,283 and U.S. Pat. No. 4,864,006.

The polymerization reaction is generally carried out at temperatures between 25° C. and 150° C., at a pressure between that atmospheric up to 10 MPa.

A further object of the present invention is a process to prepare perfluoroelastomer gels starting from a polymerization latex comprising the following steps:

Ao. optionally, mixing of the perfluoroelastomer latex with a semicrystalline (per)fluoropolymer latex, in an amount from 0% to 70% by weight, preferably from 0% to 50%, still more preferably from 2% to 30% by weight, referred to the total of dry weight perfluoroelastomer+semi-crystalline (per)fluoropolymer;

A. optionally, dilution with water of the polymerization latex of the perfluoroelastomer, or of the mixture Ao, until obtaining a perfluoroelastomer concentration, expressed in g polymer/kg latex, in the range 50-600;
B. optionally, mixing of the polymerization latex Ao, or of the diluted latex A, or of the starting latex, with one or more organic compounds soluble in the latex aqueous phase, capable to lower the latex freezing point without causing the latex coagulation, said one or more organic compounds being such and/or in an amount such that the resulting mixture has the freezing point at a temperature lower than or equal to the glass transition temperature Tg (° C.) of the latex perfluoroelastomer;
C. preparation of an aqueous solution containing an electrolyte, optionally addition of one or more organic compounds as defined in B, soluble in the latex aqueous phase, capable to lower the freezing point of the solution C, and such and/or in an amount such that the resulting solution C has a freezing point lower than or equal to the freezing point of the mixture prepared in B;
D. cooling of the polymerization latex, or of the mixture Ao, or of the diluted latex A, or of the mixture B, down to a temperature T1 lower than or equal to the glass transition temperature of the latex perfluoroelastomer;
E. cooling of the aqueous solution C to a temperature T2 lower than or equal to the glass transition temperature of the latex perfluoroelastomer, preferably T2 being substantially equal to T1;
F. formation of a gel by dripping of the mixture D into the solution E;
G. optionally, washing with water of the gel obtained in F;
H. optionally, gel drying and perfluoroelastomer obtainment.

In step Ao with dry weight of perfluoroelastomer+semicrystalline (per)fluoropolymer it is meant the residue weight after having dried the latex mixture in a stove at 90° C. until a constant weight.

As said, the perfluoroelastomer obtained at the end of the polymerization appears under aqueous latex foam. In step A, as said, generally the perfluoroelastomer concentration in the latex, expressed in g of polymer/kg of latex, is between 50 and 600. Preferably the latex concentration for the process to form perfluoroelastomer gels of the present invention, is in the range 50-300, still more preferably 100-250 g polymer/kg latex.

Step A can be omitted when, after having carried out the optional step Ao, the perfluoroelastomer concentration is within the above ranges.

According to the process of the present invention the optional step A can be carried out even before the optional step Ao.

In the optional step B the addition of one or more organic compounds soluble in the latex aqueous phase depends on the Tg (° C.) of the latex perfluoroelastomer. Step B is optional when the perfluoroelastomer has a glass transition temperature higher than 0° C.

The organic compounds used in step B must be such, and/or added in an amount such as to lower the latex freezing point, without giving coagulation, down to a temperature value lower than or equal to the latex perfluoroelastomer Tg. Generally those organic compounds lowering the freezing point of at least 1-2° C., more preferably of at least 3-6° C. with respect to the perfluoroelastomer Tg, are preferred.

In step C, as said, one or more organic compounds as defined in B can be used. Said compounds can be equal to or different from those used in step B.

The amount of said organic compounds in the mixtures prepared in B and in C is generally from 5% to 70%, preferably from 10% to 50%, more preferably from 10% to 35%, referred to the total weight of the mixture. However the amount of said compounds is such to assure a freezing point of the mixtures prepared, respectively, in B and in C, with the above requirements.

The soluble organic compounds in the latex aqueous phase usable in steps B and C of the invention process have a solubility in water higher than 1% w/w and are preferably liquid at room temperature (20-25° C.). $C_1$-$C_5$ aliphatic alcohols, for example ethyl alcohol, $C_3$-$C_4$ ketones as, for example, acetone, diols for example ethylene glycol and propylene glycol can, for example, be mentioned; ethyl alcohol is preferred.

Examples of electrolytes usable in C are inorganic salts, inorganic bases, inorganic acids. Examples of inorganic salts are aluminum sulphate, sodium sulphate; examples of inorganic bases are potassium hydroxide and sodium hydroxide; examples of inorganic acids are nitric acid, hydrochloric acid. Preferably inorganic acids, more preferably nitric acid, are used.

In step F, as said, there is the gel formation from the polymeric latex. Preferably, during the dripping of the cooled mixture obtained in D into the cooled solution obtained in E, the latter is kept under stirring so that the gel remains in suspension and does not deposit on the reactor bottom. Soft stirrings, for example from 10 to 100 rpm, can be used.

In step G the gel washing is generally carried out at temperatures between the one used in step F and 80° C., preferably from 10° C. to 40° C. Instead of water it is possible to use also neutral and/or acid aqueous solutions having pH from 1 to 7.

Preferably, at the end of this step the gel pH is brought to a value between 3 and 7, for example by washing with water.

In the optional step H drying is carried out at temperatures in the range 60° C.-140° C., preferably 90° C.-110° C., until a constant weight of the residue.

The process to form the gels of the present invention can be carried out batchwise or continuously.

It has been unexpectedly and surprisingly found by the Applicant that the invention perfluoroelastomeric gel allows to obtain manufactured articles having an improved thermal resistance, improved sealing properties, improved mechanical propeties compared with those obtainable with the perfluoro-elastomers obtained by latex coagulation according to the prior art.

When the perfluoroelastomeric gel is dried as, for example, described in the optional step H, a perfluoro-elastomer is obtained which is crosslinked to produce manufactured articles to be used, as said, in the preparation of O-ring, gaskets, shaft seals, fuel hoses, etc., having an improved thermal resistance, improved sealing properties, improved mechanical properties in comparison with those obtainable according to the prior art.

The perfluoroelastomers obtainable from the perfluoroelastomeric gel, for example by using the optional step H of the invention process, are cured for obtaining manufactured articles having the improved combination of the above properties.

The results obtained by the Applicant with the present invention are, as said, surprising and unexpected since they are not obtainable with the coagulation process carried out according to the prior art, generally comprising the following steps:
  latex coagulation by using destabilizing electrolytes (salts, bases or acids);
  separation of the coagulated polymer from the mother liquors;

optionally, polymer washing with water;
polymer drying.
See the comparative Examples.

Curing is carried out by proxidic way. Therefore, preferably, the perfluoroelastomer contains in the chain and/or in end position to the macromolecule iodine and/or bromine atoms. The introduction in the perfluoroelastomeric matrix of such iodine and/or bromine atoms can be carried out by the addition of brominated and/or iodinated "cure-site" comonomers, as bromo and/or iodo olefins having from 2 to 10 carbon atoms, as described, for example, in U.S. Pat. No. 4,035,565 and U.S. Pat. No. 4,694,045, or iodo and/or bromo fluoroalkylvinylethers, as described in U.S. Pat. No. 4,745,165, U.S. Pat. No. 4,564,662 and EP 199,138, in amounts such that the content of "cure-site" comonomers in the end product is generally from 0.05 to 4 moles per 100 moles of the other basic monomeric units.

Other iodinated usable compounds are the tri-iodinated compounds deriving from triazines as described in the European patent application EP 860,436 and in the European patent application EP 979,832.

Alternatively or also in combination with "cure-site" comonomers, it is possible to introduce in the perfluoroelastomer iodine and/or bromine atoms in end position by addition to the reaction mixture of iodinated and/or brominated chain transfer agents as, for example, the compounds of formula $R''_f(I)_{xi}(Br)_{yi}$, wherein $R''_f$ is a (per)-fluoroalkyl or a (per)fluorochloroalkyl having from 1 to 8 carbon atoms, xi and yi are integers between 0 and 2, with $1 \leq xi+yi \leq 2$ (see, for example, U.S. Pat. No. 4,243,770 and U.S. Pat. No. 4,943,622). It is also possible to use as chain transfer agents alkaline or alkaline-earth metal iodides and/or bromides, according to U.S. Pat. No. 5,173,553.

The total iodine and/or bromine amount in end position ranges from 0.001% to 3%, preferably from 0.01% to 1.5% by weight with respect to the total polymer weight.

Preferably the invention perfluoroelastomers contain iodine; more preferably the iodine is in end position.

In combination with the chain transfer agents containing iodine and/or bromine, other chain transfer agents Known in the prior art, as ethyl acetate, diethylmalonate, etc., can be used.

To the curing blend other products are then added as, for example, the following:

peroxides capable to generate radicals by heating, for example: dialkylperoxides, in particular di-terbutyl-peroxide and 2,5-dimethyl-2,5-di(terbutylperoxy)hexane; dialkylarylperoxides as, for example, dicumyl peroxide; dibenzoyl peroxide; diterbutyl perbenzoate; di[1,3-dimethyl-3-(terbutylperoxy)butyl]-carbonate. Other peroxidic systems are described, for example, in patent applications EP 136,596 and EP 410,351.

The peroxide amount is generally from 0.5% to 10% by weight with respect to the polymer, preferably 0.6%-4% by weight;

curing coagents, in amounts generally between 0.5 and 10%, preferably between 1 and 7%, by weight with respect to the polymer; among them, bis-olefins of formula (I); triallyl-cyanurate, triallyl-isocyanurate (TAIC), tris-(diallylamine)-s-triazine; triallylphosphite; N,N-diallyl-acrylamide; N,N,N',N'-tetraallyl-malonamide; tri-vinyl-isocyanurate; and 4,6-tri-vinyl-methyl-trisiloxane, etc., are commonly used: TAIL and the bis-olefin of formula $CH_2\!=\!CH\!-\!(CF_2)_6\!-\!CH\!=\!CH_2;$ are particularly preferred;

optionally a metal compound, in amounts between 1 and 15%, preferably from 2 to 10% by weight with respect to the polymer, selected from divalent metal oxides or hydroxides as, for example, Mg, Zn, Ca or Pb, optionally associated to a weak acid salt, as stearates, benzoates, carbonates, oxalates or phosphites of Ba, Na, K, Pb, Ca;

other conventional additives, as mineral fillers, semicrystalline fluoropolymers in powder, pigments, antioxidants, stabilizers and the like.

The preferred curing for perfluoroelastomers comprising iodine is carried out by using a peroxidic crosslinking system comprising:

as crosslinking agent a bis-olefin having general formula:

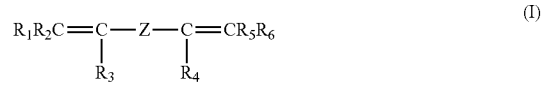

wherein:

$R_1$, $R_2$, $R_3$, $R_4$, $R_5$, $R_6$ and Z are as above defined;

the crosslinking agent amount generally being from 0.5% to 10% by weight with respect to the polymer, preferably 1%-5% by weight;

peroxides capable to generate radicals by heating, for example: dialkylperoxides, in particular di-terbutyl-peroxide and 2,5-dimethyl-2,5-di(terbutylperoxy)hexane; dialkylarylperoxides such as for example dicumyl peroxide; dibenzoyl peroxide; diterbutyl perbenzoate; di[1,3-dimethyl-3-(terbutylperoxy)butyl]-carbonate. Other peroxidic systems are described, for example, in patent applications EP 136,596 and EP 410,351.

The peroxide amount is generally from 0.5% to 10% by weight with respect to the polymer, preferably 0.6%-4% by weight.

It has been found, furthermore, that besides the above crosslinking system, known crosslinking agents, preferably TAIC, can also be used. It has been found by the Applicant that the addition of small amounts of TAIC to the crosslinking system allows to further improve the perfluoro-elastomer properties as, for example, the thermal stability and the mechanical properties.

The gel obtained with the invention process can be used to confer an improved chemical resistance and a reduced permeability to solvents, to sealing manufactured articles, for example O-ring or shaft seals, obtained with non fluorinated or fluorinated elastomers. For this purpose the gel is preferably additioned of the crosslinking ingredients, for example those above mentioned, the obtained mixture is spread on the coating and is cured.

Examples of non fluorinated elastomers are: polyisoprene, poly (styrene/butadiene), poly (acrylonitrile/butadiene), poly (ethylene/propylene/diene), polychloroprene, polyurethanes, polyisobutylene. Examples of fluorinated elastomers are VDF-based elastomers with comonomers as hexafluoropropene, methylvinylether, tetrafluoroethylene.

The polymer Tg is determined by DSC on a latex portion, coagulated by conventional methods, for example in stove at 90° C. until a constant weight. See ASTM D 3418.

The Applicant has found that the thermal stability of the manufactured articles obtained with the perfluoroelatomers of the present invention, for example O-ring, is maintained even over 300° C. The O-ring prepared with perfluoroelastomers obtained with known coagulation processes, for example by coagulation with inorganic salts, show instead higher compression set values.

The following Examples are given for illustrative but not limitative purposes of the present invention.

EXAMPLES

Example A

Polymerization of the Perfluoroelastomer Latex

In a 22 l (liters) steel autoclave, equipped with stirrer working at 460 rpm there have been introduced, after evacuation, 14.5 liters of demineralized water and 145 ml of a microemulsion obtained by mixing:

32 ml of a perfluoropolyoxyalkylene having acid end groups of formula:

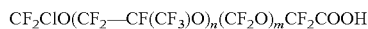

$CF_2ClO(CF_2-CF(CF_3)O)_n(CF_2O)_mCF_2COOH$ wherein n/m=10, having average molecular weight 600;
32 ml of an aqueous solution of NH$_4$OH at 30% by volume;
62 ml of demineralized water;
19 ml of Galden® D02 of formula:

$CF_3O(CF_2-CF(CF_3)O)_n(CF_2O)_mCF_3$ wherein n/m=20, having average molecular weight of 450.

The autoclave was then heated to 80° C. and maintained at said temperature for the whole reaction. Then 35 g of 1,4-diiodoperfluorobutane (C$_4$F$_8$I$_2$) were introduced in the autoclave.

The mixture of monomers having the following molar composition is then fed: tetrafluoroethylene (TFE) 35%, perfluoromethylvinylether (MVE) 65%, so as to bring the pressure to 25 bar rel (2.5 MPa).

In the autoclave are then introduced:
0.7 g of ammonium persulphate (APS) as initiator;
18 g of bis-olefin of formula CH$_2$=CH—(CF$_2$)$_6$—CH=CH$_2$.

The bis-olefin addition was carried out in 20 portions, each of 0.9 g, starting from the polymerization start and for every 5% increase in the monomer conversion.

The pressure of 25 bar rel (2.5 MPa) is maintained constant for the whole polymerization by feeding a mixture having the following molar composition: tetrafluoroethylene (TFE) 60%, perfluoromethylvinylether (MVE) 40%.

After having fed 6,600 g of the monomeric mixture, the autoclave is cooled and the latex discharged. The reaction lasted on the whole 160 min.

The so obtained latex has a concentration equal to 290 $g_{polymer}/kg_{latex}$ and is used in the invention Examples and in the comparative Examples.

50 ml of the latex are coagulated by dripping into an aluminum sulphate solution. The obtained polymer is dried at 90° C. in an air-circulation oven for 16 hours. By DSC the material Tg is determined, being equal to −3° C.

Example B

Obtainment of the Semicrystalline (Per)Fluoropolymer Latex

In a 10 l autoclave, equipped with stirrer working at 545 rpm there have been introduced, after evacuation, 6.5 liters of demineralized water and 260 ml of a perfluoropolyoxyalkylene microemulsion previously obtained by 56.4 ml of a perfluoropolyoxyalkylene having acid end group of formula:

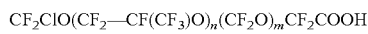

$CF_2ClO(CF_2-CF(CF_3)O)_n(CF_2O)_mCF_2COOH$ wherein n/m=10, having average molecular weight 600;
56.4 ml of an aqueous solution of NH$_4$OH at 30% by volume;
112.8 ml of demineralized water;
34.4 ml of Galden® D02 of formula:

$CF_3O(CF_2-CF(CF_3)O)_n(CF_2O)_mCF_3$ wherein n/m=20, having average molecular weight of 450.

The autoclave was then heated to 80° C. and maintained at said temperature for the whole reaction. The autoclave was brought to the pressure of 0.6 bar (0.06 MPa) with ethane and then to the pressure of 20 bar (2 MPa) with a monomeric mixture constituted of 6.5% by moles of perfluoromethylvinylether (PMVE) and 93.5% by moles of tetrafluoroethylene (TFE).

Then 0.13 g of ammonium persulphate (APS) as initiator were then introduced in the autoclave.

During the reaction the pressure is maintained at 20 bar by continuously feeding the following monomeric mixture: 2% by moles of PMVE and 98% of TFE.

After 160 minutes of reaction, corresponding to 100% of monomer conversion, the autoclave was cooled and the latex discharged.

The so obtained latex is used in the Fxamples and in the comparative Examples.

Example 1

Latex Gelling and Gel Washing 8 l of demineralized water, 3 l of ethyl alcohol at 95% in water, and 8 l of the latex prepared according to the Example A are fed in sequence in a 30 l jacketed glass reactor and equipped with stirrer. The reactor content is brought to the temperature of −9° C.

17 l of demineralized water, 3.5 l of ethyl alcohol at 95% in water, and 1.5 l of a nitric acid solution in water at 20% by weight are fed in sequence in another 50 l jacketed glass reactor and equipped with stirrer. The reactor content is brought to the temperature of −9° C.

Successively, by means of a peristaltic pump, the content of the 30 l reactor is fed under stirring into the 50 l reactor, maintaining the temperature at −9° C.

When the feeding is over, stirring is stopped; the obtained gel is allowed to separate on the bottom and the aqueous supernatant phase is drained.

The temperature is brought to 10° C. and one proceeds then to carry out 4 washings: for each of said washings 25 l of demineralized water are fed under stirring to the 50 l reactor. The material is let under stirring for 10 minutes, stirring is stopped and the aqueous supernatant phase is drained.

At the end of the fourth washing, the aqueous phase as a pH equal to 3.3. The perfluoroelastomeric gel is discharged from the reactor bottom. The obtained gel contains 42% by weight of perfluoroelastomer, density equal to 1.4 g/cm³, and it appears as a transparent gelatinous solid. Then, the imbibition water is removed by pressing; it has a pH equal to 2.9. Successively the perfluoroelastomer is dried at 90° C. in an air-circulation oven for 16 hours.

The obtained perfluoroelastomer is mixed by using an open mixer with the crosslinking ingredients reported in Table 1. The so obtained mixture is molded at 170° C. for 8 min.

The obtained results are reported in Table 1.

Example 2 (Comparative)

Latex Coagulum with Aluminum Sulphate

All the operations described in this Example, where not otherwise indicated, are carried out at room temperature (20° C.-25° C.).

15 l of demineralized water and 90 g of hydrated aluminum sulphate ($Al_2(SO_4)_3 \cdot 13H_2O$) are fed in sequence into a 40 l glass reactor and equipped with stirrer. Then 8 l of the latex produced according to the Example A are dripped under stirring.

When the feeding is over, stirring is stopped; the coagulated polymer is let separate on the bottom and the aqueous supernatant phase is drained. One proceeds then to carry out 4 washings: for each of said washings 25 l of demineralized water are fed under stirring to the reactor. The material is let under stirring for 10 minutes, stirring is stopped and the aqueous supernatant phase is drained.

At the end of the fourth washing, the polymer is discharged from the reactor bottom; the imbibition water is removed by pressing. Successively the polymer is dried at 90° C. in an air-circulation oven for 16 hours.

One proceeds then to the blend preparation and to the characterizations as described in the Example 1.

Example 3

Latex Gelling and Gel Washing 8 l of demineralized water, 3 l of ethyl alcohol at 95% in water, 6.4 l of the perfluoroelastomer latex prepared according to the Example A and 1.6 l of the semicrystalline (per)fluoropolymer latex prepared according to the Example B are fed in sequence in a 30 l jacketed glass reactor and equipped with stirrer. The reactor content is brought to the temperature of –9° C.

17 l of demineralized water, 3.5 l of ethyl alcohol at 95% in water and 1.5 l of a nitric acid solution in water at 20% by weight are fed in sequence in another 50 l jacketed glass reactor and equipped with stirrer. The reactor content is brought to the temperature of –9° C.

Successively, by a peristaltic pump, the content of the 30 l reactor is fed under stirring into the 50 l reactor, maintaining the temperature at –9° C.

When the feeding is over, stirring is stopped; the obtained gel is let separate on the bottom and the aqueous supernatant phase is drained.

The temperature is brought to 10° C. and one proceeds then to carry out 4 washings: for each of said washings 25 l of demineralized water are fed under stirring to the 50 l reactor. The material is let under stirring for 10 minutes, stirring is stopped and the aqueous supernatant phase is drained.

At the end of the fourth washing, the aqueous phase has a pH equal to 4. The perfluoroelastomeric gel is discharged from the reactor bottom. The obtained gel contains 48% by weight of perfluoropolymer, density equal to 1.6 g/cm³, and it appears as a transparent gelatinous solid. Then, the imbibition water is removed by pressing; it has a pH equal to 3.1. Successively the polymer is dried at 90° C. in an air-circulation oven for 16 hours.

The obtained polymer is mixed by using an open mixer with the crosslinking ingredients reported in Table 1. The so obtained mixture is molded at 170° C. for 8 min.

The obtained results are reported in Table 1.

Example 4 (Comparative)

Latex Coagulum with Aluminum Sulphate

All the operations described in this Example, where not otherwise indicated, are carried out at room temperature (20° C.-25° C.).

15 l of demineralized water and 90 g of hydrated aluminum sulphate ($Al_2(SO_4)_3 \cdot 13H_2O$) are fed in sequence in a 40 l glass reactor and equipped with stirrer. Then a mixture composed of 6.4 l of the latex produced according to the Example A and 1.6 l of the latex prepared according to the Example B is dripped under stirring.

When the feeding is over, stirring is stopped; the coagulated polymer is let separate on the bottom and the aqueous supernatant phase is drained. One proceeds then to carry out 4 washings: for each of said washings 25 l of demineralized water are fed under stirring to the reactor.

The material is let under stirring for 10 minutes, stirring is stopped and the aqueous supernatant phase is drained.

At the end of the fourth washing, the polymer is discharged from the reactor bottom; the imbibition water is removed by pressing. Successively the polymer is dried at 90° C. in an air-circulation oven for 16 hours.

One proceeds then to the preparation of the blend and to the characterizations as described in the Example 3.

Example 5

The latex obtained according to the Example A is gelled and the obtained gel washed according to the process described in the Example 1. The polymer is dried as described in the Example 1 and formulated as reported in Table 2. The so obtained blend is molded at 170° C. for 8 min.

The obtained results are reported in Table 2.

Example 6 (Comparative)

The latex obtained according to the Example A is coagulated and the obtained polymer washed according to the process described in the Example 2 (comparative). The polymer is dried as described in the Example 2 (comparative) and formulated as reported in Table 2. The so obtained blend is molded at 170° C. for 8 min.

The obtained results are reported in Table 2. Comment to the results reported in Tables 1 and 2

The results of the Tables show that the cured manufactured articles obtained from the invention perfluoroelastomers have improved thermal resistance properties (see the mechanical properties data after thermal treatment) and improved compression set in comparison with the manufactured articles of the same polymers obtained according to the prior art.

TABLE 1

| Composition in phr | Ex. 1 | Ex. 2 comp. | Ex. 3 | Ex. 4 comp |
|---|---|---|---|---|
| Polymer | 100 | 100 | 100 | 100 |
| bis-olefin | 1.5 | 1.5 | 1.5 | 1.5 |
| Luperox ® 101 XL 45 | 1.5 | 1.5 | 1.5 | 1.5 |
| ZnO | 5 | 5 | 4 | 4 |
| Austin Black ® | 8 | 8 | 0 | 0 |
| Sevacarb ® MT-LS | 7 | 7 | 0 | 0 |
| Mechanical properties after post-treatment: 8 hours of gradient + 16 hours of residence at 290° C. (ASTM D 412C) | | | | |
| Stress at break (MPa) | 19.6 | 18.4 | 22.1 | 19.1 |
| Elongation at break (%) | 180 | 190 | 235 | 228 |
| Hardness (Shore A) | 73 | 73 | 73 | 70 |

TABLE 1-continued

| Composition in phr | Ex. 1 | Ex. 2 comp. | Ex. 3 | Ex. 4 comp |
|---|---|---|---|---|
| Thermal treatment: 70 hours at 316° C. (ASTM D 573) | | | | |
| Δ % Stress at break | −40 | −50 | −73 | −74 |
| Δ % Elongation at break | +60 | +85 | +148 | +173 |
| Δ Hardness (Shore A) | −2 | −2 | −3 | −3 |
| Compression set: 70 hours at 316° C. (ASTM D 395 method B) | | | | |
| O-ring #214 | 65 | 80 | — | — |
| Compression set: 70 hours at 300° C. (ASTM D 395 method B) | | | | |
| O-ring #214 | 48 | 75 | — | — |
| Compression set: 70 hours at 250° C. (ASTM D 395 method B) | | | | |
| O-ring #214 | — | — | 40 | 55 |

TABLE 2

| Composition in phr | Ex. 5 | Ex. 6 comp. |
|---|---|---|
| Polymer | 100 | 100 |
| TAIC Drimix ® | 2 | 2 |
| Luperox ® 101 XL 45 | 1.5 | 1.5 |
| ZnO | 5 | 5 |
| Black ® N990 MT | 15 | 15 |
| Mechanical properties after post-treatment: 1 hour of gradient + 4 hours of residence at 230° C. (ASTM D 412C) | | |
| Stress at break (MPa) | 20.4 | 18.1 |
| Elongation at break (%) | 118 | 142 |
| Hardness (Shore A) | 74 | 68 |
| Thermal treatment: 70 hours at 275° C. (ASTM D 573) | | |
| Δ % Stress at break | −9 | −15 |
| Δ % Elongation at break | +74 | +100 |
| ΔHardness (Shore A) | −1 | +1 |
| Thermal treatment: 24 hours at 290° C. (ASTM D 573) | | |
| Δ % Stress at break | −7 | −12 |
| Δ % Elongation at break | +46 | +68 |
| Δ Hardness (Shore A) | −2 | −2 |

The invention claimed is:

1. A process of forming a perfluoroelastomer gel comprising the following steps, starting from a perfluoroelastomer polymerization latex wherein the latex perfluoroelastomer has a glass transition temperature Tg (C) of at most 0° C.:
Ao. mixing the perfluoroelastomer latex with a semicrystalline (per) fluoropolymer latex, in an amount from greater than 0% to 70% by weight referred to the total dry weight perfluoroelastomer+semicrystalline (per) fluoropolymer;
B. mixing of the polymerization latex Ao with one or more organic compounds soluble in the latex aqueous phase, capable to lower, the latex freezing point without causing the latex coagulation, said one or more organic compounds being such and/or in an amount such that the resulting mixture has the freezing point at a temperature lower than or equal to the glass transition temperature Tg (C) of the latex perfluoroelastomer;
C. preparation of an aqueous solution containing an electrolyte, soluble in the latex aqueous phase, capable to lower the freezing point of the solution C, and such and/or in an amount such that the resulting solution C has a freezing point lower than or equal to the freezing point of the mixture prepared in B;
D. cooling of the mixture B, down to a temperature T1 lower than or equal to the glass transition temperature of the latex perfluoroelastomer;
E. cooling of the aqueous solution C to a temperature T2 lower than or equal to the glass transition temperature of the latex perfluoroelastomer;
F. formation of a gel by dripping of the mixture D into the solution E; wherein said perfluoroelastomer gel has the following properties:
appearance of a transparent gelatinous solid;
water content between 10% and 90% by weight; and
density between 1.1 and 2.1 g/cm³,
wherein when said perfluoroelastomer gel is dried in a stove at 90° C. until it reaches a constant weight, it gives a curable perfluoroelastomer,
wherein the perfluoroelastomeric gel contains TFE-based perfluoroelastomers with at least another (per) fluorinated comonomer having at least one unsaturation of ethylene type, and
wherein the comonomer in the perfluoroelastomers is selected from the following:
$CF_2=CFOR^f$ (per)fluoroalkylvinylethers (PAVE), wherein $R_f$ is a $C_1$-$C_6$ (per) fluoroalkyl;
$CF_2=CFOX$ (per) fluoro-oxyalkylvinylethers, wherein X is a $C_1$-$C_{12}$ (per) fluorooxyalkyl, containing one or more or more ether groups;
perfluorodioxoles of formula

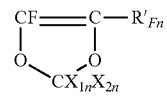

(IA)

wherein $R'_{Fn}$ is equal to $R_{Fn}$ or $OR_{Fn}$ wherein $R_{Fn}$ is a linear or branched perfluoroalkyl radical with 1-5 carbon atoms; $X_{1n}$ and $X_{2n}$, equal to or different from each other, are F, CF3; (per) fluorovinylethers (MOVE) of general formula $CFX_{AI}=CX_{AI}OCF_2OR_{AI}$ (A-I) wherein $R_{AI}$ is a $C_2$-$C_6$, linear, branched or C5-C6 cyclic perfluoroalkyl group, or a $C_2$-$C_6$ linear, branched perfluorooxyalkyl group containing from one to three oxygen atoms; $R_{AI}$ can optionally contain from 1 to 2 atoms, equal or different, selected from the following: Cl, Br, I;)$_{(AI}$=F; the compounds of general formula: $CFX_{AI}=CX_{AI}OCF_2OCF_2CF_2Y_{AI}$ (A-II), wherein $Y_{AI}$= F, $OCF_3$;)$_{(AI}$ as above; the following: (MOVE 1) $CF_2=CFOCF_2OCF_2CF_3$ and (MOVE 2) $CF_2=CFOCF_2OCF_3$;
$C_3$-$C_8$ perfluoroolefins;
C2-C8 (per) fluoroolefins containing chlorine and/or bromine and/or iodine atoms;
perfluorovinylethers containing hydrocyanic groups.

2. A process according to claim 1, further comprising:
A. dilution with water of the polymerization latex of the perfluoroelastomer, or of the mixture Ao, until obtaining a perfluoroelastomer concentration, expressed in g polymer/kg latex, between 50 and 600.

3. A process according to claim 1, wherein organic compounds are used lowering the freezing point of at least 1-2° C. with respect to the perfluoroelastomer Tg.

4. A process according to claim 1, wherein the amount of the organic compounds as defined in B, in the mixtures prepared in B and in C, is from 5% to 701%, referred to the total weight of the mixture.

5. A process according to claim 1, wherein the organic compounds usable in steps B and C have a solubility in water higher than 1% to w/w and are liquid at room temperature (20-25° C.).

6. A process according to claim 5, wherein the organic compounds are selected from $C_1$-$C_5$ aliphatic alcohols, $C_3$-$C_4$ ketones, diols selected from ethylene glycol and propylene glycol.

7. A process according to claim 1, wherein the electrolytes used in C are selected from inorganic salts, inorganic bases, and inorganic acids.

8. A process according to claim 1, further comprising:
G. washing with water of the gel obtained in F;
wherein in step G the gel washing is carried out at temperatures between that used in step F and 80° C. and at the place of water, neutral and/or acid aqueous solutions having pH from 1 to 7 are optionally used.

9. A process according to claim 1, further comprising
G. washing with water of the gel obtained in F;
wherein at the end of step G the gel pH is brought to a value between 3 and 7.

10. A process according to claim 1, further comprising
H. gel drying and obtainment of the perfluoroelastomer, wherein in step H the drying is carried out at temperatures in the range 60° C-140° C. until a constant weight of the residue.

11. A process according to claim 1, carried out batchwise or continuously.

12. A process according to claim 1, wherein the monomeric compositions of the perfluoroelastomers are the following, the sum of the comonomer percentages being 100%:
tetrafluoroethylene (TFE) 50-85%, perfluoroalkyl-vinylether (PAVE) and/or perfluorovinylethers (MOVE) 15-50%.

13. A process according to claim 12, wherein the monomeric compositions of the perfluoroelastomers are the following, the sum of the comonomer percentages being 100%: TFE 50-85%, PAVE 15-50%; TFE 50-85%, MOVE 1 15-50%; TFE 50-85%, MOVE 2 15-50%; TFE 50-85%, PAVE 1-40%, MOVE 1 1-40%; TFE 50-85%, PAVE 1-40%, MOVE 2 1-40%.

14. The process according to claim 1, wherein the perfluoroelastomers comprise also monomeric units deriving from a bis-olefin of general formula:
wherein:

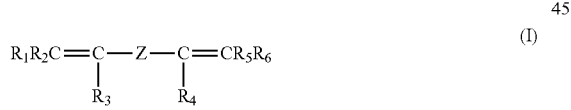

$R_1, R_2, R_3, R_4, R_5, R_6$, equal to or different from each other, are H or $C_1$-$C_5$ alkyls; Z is a $C_1$-$C_{18}$ linear or branched alkylene or cycloalkylene radical, optionally containing oxygen atoms, or a (per) fluoropolyoxyalkylene radical.

15. A process according to claim 14, wherein the unit amount in the chain deriving from the bis-olefins of formula (I) is from 0.01 to 1.0 moles per 100 moles of the other monomeric units, constituting the basic perfluoroelastomer structure.

16. A process according to claim 1 containing a semicrystalline (per) fluoropolymer, in an amount in per cent by weight referred to the total dry weight perfluoroelastomer +semicrystalline perfluoropolymer, from 0% to 70% by weight.

17. A process according to claim 16, wherein the semicrystalline (per) fluoropolymer is constituted of tetrafluoroethylene (TFE) homopolymers, or TFE copolymers with one or more monomers containing at least one unsaturation of ethylene type, in an amount from 0.01% to 10% by moles on the total of the monomer moles.

18. A process of forming a perfluoroelastomer gel comprising the following steps, starting from a perfluoroelastomer polymerization latex wherein the latex perfluoroelastomer has a glass transition temperature Tg (C) of at most 0° C.:
A. dilution with water of the polymerization latex of the perfluoroelastomer until obtaining a perfluoroelastomer concentration, expressed in g polymer/kg latex, between 50 and 600;
B. mixing of the diluted latex A with one or more organic compounds soluble in the latex aqueous phase, capable to lower, the latex freezing point without causing the latex coagulation, said one or more organic compounds being such and/or in an amount such that the resulting mixture has the freezing point at a temperature lower than or equal to the glass transition temperature Tg (C) of the latex perfluoroelastomer;
C. preparation of an aqueous solution containing an electrolyte, soluble in the latex aqueous phase, capable to lower the freezing point of the solution C, and such and/or in an amount such that the resulting solution C has a freezing point lower than or equal to the freezing point of the mixture prepared in B;
D. cooling the mixture B, down to a temperature T1 lower than or equal to the glass transition temperature of the latex perfluoroelastomer;
E. cooling of the aqueous solution C to a temperature T2 lower than or equal to the glass transition temperature of the latex perfluoroelastomer;
F. formation of a gel by dripping of the mixture D into the solution E; wherein said perfluoroelastomer gel has the following properties:
appearance of a transparent gelatinous solid;
water content between 10% and 90% by weight; and
density between 1.1 and 2.1 g/cm$^3$,
wherein when said perfluoroelastomer gel is dried in a stove at 90° C. until it reaches a constant weight, it gives a curable perfluoroelastomer,
wherein the perfluoroelastomeric gel contains TFE-based perfluoroelastomers with at least another (per) fluorinated comonomer having at least one unsaturation of ethylene type, and
wherein the comonomer in the perfluoroelastomers is selected from the following:
$CF^2$=$CFOR^f$ (per)fluoroalkylvinylethers (PAVE), wherein $R_f$ is a $C_1$-$C_6$ (per) fluoroalkyl;
$CF_2$=CFOX (per) fluoro-oxyalkylvinylethers, wherein X is a $C_1$-$C_{12}$ (per) fluorooxyalkyl, containing one or more or more ether groups; perfluorodioxoles of formula

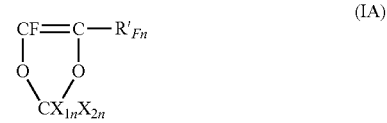

wherein $R'_{Fn}$ is equal to $R_{Fn}$ or $OR_{Fn}$ wherein $R_{Fn}$ is a linear or branched perfluoroalkyl radical with 1-5 carbon atoms; $X_{1n}$ and $X_{2n}$, equal to or different from each other, are F, CF3; (per) fluorovinylethers (MOVE) of general formula $CFX_{AI}$=$CX_{AI}OCF_2OR_{AI}$ (A-I) wherein $R_{AI}$ is a $C_2$-$C_6$, linear, branched or C5-C6 cyclic perfluoroalkyl group, or a $C_2$-$C_6$ linear, branched perfluorooxyalkyl group containing from one to three oxygen atoms; $R_{AI}$ can optionally contain from 1 to 2 atoms, equal or different, selected from the following: Cl, Br, I;)$(_{AI}$=F; the compounds of general formula: $CFX_{AI}=CX_{AI}OCF_2OCF_2CF_2Y_{AI}$ (A-II), wherein $Y_{AI}$ =F, $OCF_3$;)$(_{AI}$ as above; the following: (MOVE 1) $CF_2$=$CFOCF_2OCF_2CF_3$ and (MOVE 2) $CF_2$=$CFOCF_2OCF_3$;

$C_3$-$C_8$ perfluoroolefins;

C2-C8 (per) fluoroolefins containing chlorine and/or bromine and/or iodine atoms;

perfluorovinylethers containing hydrocyanic groups.

19. A process according to claim 18, further comprising:
Ao. mixing the perfluoroelastomer latex with a semicrystalline (per) fluoropolymer latex, in an amount from greater than 0% to 70% by weight referred to the total dry weight perfluoroelastomer +semicrystalline (per) fluoropolymer.

20. A process according to claim 18, wherein organic compounds are used lowering the freezing point of at least 1-2° C. with respect to the perfluoroelastomer Tg.

21. A process according to claim 18, wherein the amount of the organic compounds as defined in B, in the mixtures prepared in B and in C, is from 5% to 701%, referred to the total weight of the mixture.

22. A process according to claim 18, wherein the organic compounds usable in steps B and C have a solubility in water higher than 1% to w/w and are liquid at room temperature (20-25° C.).

23. A process according to claim 22, wherein the organic compounds are selected from $C_1$-$C_5$ aliphatic alcohols, $C_3$-$C_4$ ketones, diols selected from ethylene glycol and propylene glycol.

24. A process according to claim 18, wherein the electrolytes used in C are selected from inorganic salts, inorganic bases, and inorganic acids.

25. A process according to claim 18, further comprising:
G. washing with water of the gel obtained in F;
wherein the gel washing is carried out at temperatures between that used in step F and 80° C. and at the place of water, neutral and/or acid aqueous solutions having pH from 1 to 7 are optionally used.

26. A process according to claim 18, further comprising:
G. washing with water of the gel obtained in F;
wherein at the end of step G the gel pH is brought to a value between 3 and 7.

27. A process according to claim 18, further comprising:
H. gel drying and obtainment of the perfluoroelastomer,
wherein in step H the drying is carried out at temperatures in the range 60° C-140° C. until a constant weight of the residue.

28. A process according to claim 18, wherein the monomeric compositions of the perfluoroelastomers are the following, the sum of the comonomer percentages being 100%:
tetrafluoroethylene (TFE) 50-85%, perfluoroalkyl-vinylether (PAVE) and/or perfluorovinylethers (MOVE) 15-50%.

29. A process according to claim 28, wherein the monomeric compositions of the perfluoroelastomers are the following, the sum of the comonomer percentages being 100%: TFE 50-85%, PAVE 15-50%; TFE 50-85%, MOVE 1 15-50%; TFE 50-85%, MOVE 2 15-50%; TFE 50-85%, PAVE 1-40%, MOVE 1 1-40%; TFE 50-85%, PAVE 1-40%, MOVE 2 1-40%.

30. The process according to claim 18, wherein the perfluoroelastomers comprise also monomeric units deriving from a bis-olefin of general formula:
wherein:

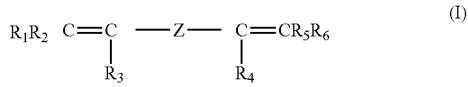

$R_1, R_2, R_3, R_4, R_5, R_6$, equal to or different from each other, are H or $C_1$-$C_5$ alkyls; Z is a $C_1$-$C_{18}$ linear or branched alkylene or cycloalkylene radical, optionally containing oxygen atoms, or a (per) fluoropolyoxyalkylene radical.

31. A process according to claim 30, wherein the unit amount in the chain deriving from the bis-olefins of formula (I) is from 0.01 to 1.0 moles per 100 moles of the other monomeric units, constituting the basic perfluoroelastomer structure.

32. A process according to claim 18 containing a semicrystalline (per) fluoropolymer, in an amount in per cent by weight referred to the total dry weight perfluoroelastomer +semicrystalline perfluoropolymer, from 0% to 70% by weight.

33. A process according to claim 32, wherein the semicrystalline (per) fluoropolymer is constituted of tetrafluoroethylene (TFE) homopolymers, or TFE copolymers with one or more monomers containing at least one unsaturation of ethylene type, in an amount from 0.01% to 10% by moles on the total of the monomer moles.

* * * * *